US012785992B2

(12) United States Patent
Anderson et al.

(10) Patent No.: US 12,785,992 B2
(45) Date of Patent: Nov. 3, 2026

(54) SECURE HARDWARE CRYPTOCURRENCY KEYSTORE AND KEY GENERATION CEREMONY

(71) Applicant: SALT BLOCKCHAIN INC., Denver, CO (US)

(72) Inventors: Scott Dirk Anderson, Erie, CO (US); Andrew J. May, Denver, CO (US)

(73) Assignee: SALT Blockchain, Inc., Denver, CO (US)

( * ) Notice: Subject to any disclaimer, the term of this patent is extended or adjusted under 35 U.S.C. 154(b) by 163 days.

(21) Appl. No.: 18/295,806

(22) Filed: Apr. 4, 2023

(65) Prior Publication Data

US 2023/0396456 A1 Dec. 7, 2023

Related U.S. Application Data

(63) Continuation of application No. 17/833,715, filed on Jun. 6, 2022, now abandoned.

(51) Int. Cl.
*H04L 9/00* (2022.01)
*H04L 9/08* (2006.01)

(52) U.S. Cl.
CPC .............. *H04L 9/50* (2022.05); *H04L 9/0869* (2013.01)

(58) Field of Classification Search
None
See application file for complete search history.

(56) References Cited

U.S. PATENT DOCUMENTS

| | | | | |
|---|---|---|---|---|
| 2019/0220859 | A1* | 7/2019 | Weight | G06Q 20/3829 |
| 2019/0305943 | A1* | 10/2019 | Hoersten | H04L 9/14 |
| 2019/0318356 | A1* | 10/2019 | Martin | G06F 21/6209 |
| 2020/0028675 | A1* | 1/2020 | Gancarz | G06Q 20/3829 |
| 2022/0253813 | A1* | 8/2022 | Pospieszalski | H04L 9/50 |

OTHER PUBLICATIONS

"What Are Hardware Security Modules (HSM)s?" [online] Entrust, Mar. 2021 [retrieved Sep. 27, 2022]. Retrieved from the Internet via Wayback Machine: URL: https://web.archive.org/web/20210303064519/https://www.entrust.com/resources/hsm/faq/what-are-hardware-security-modules (Year: 2021).*

* cited by examiner

*Primary Examiner* — Taghi T Arani
*Assistant Examiner* — Joshua Raymond White
(74) *Attorney, Agent, or Firm* — Adams & Reese LLP

(57) ABSTRACT

A method and apparatus for a secure hardware cryptographic keystore for custody of cryptocurrency funds (and other digital such as NFTs) which ensures no individual participant in key generation or transaction signing ever has access to the full key or even a complete key-part, thereby eliminating the traditional need to rotate keys and re-encrypt data when authorized key-holders change. The system includes an air-gapped key generator machine and an air-gapped transaction signing machine that lack network communications capabilities. The key generator machine receives an entropy source and produces sets of public/private key pairs for use on a cryptocurrency blockchain.

17 Claims, 9 Drawing Sheets

SECURE HARDWARE CRYPTOCURRENCY KEYSTORE AND KEY GENERATION CEREMONY

CROSS-REFERENCE TO RELATED APPLICATION(S)

This application is a continuation of U.S. application Ser. No. 17/833,715, filed Jun. 6, 2022, titled "SECURE HARDWARE CRYPTOCURRENCY KEYSTORE AND KEY GENERATION CEREMONY," the disclosure of which is incorporated herein in its entirety.

BACKGROUND

Most cryptocurrencies, digital assets, and other blockchain tokens (such as non-fungible tokens or NFTs) operate on a principle of public key cryptography, also known as asymmetric cryptography, wherein pairs of keys are generated based on an entropy input. A pair of keys includes a public key, used to generate a wallet address or payment address, which may be shared with other participants or published, and a private key, which is used to cryptographically sign a spending transaction and must be kept secret or else cryptocurrency coins could be stolen by any attacker who can gain access to the private key. For businesses that provide cryptocurrency custody services, safe storage of the spending keys is paramount to their value proposition.

Accordingly, there is a need for a secure and reliable device for storing cryptocurrency spending keys in a way in which they will not be lost or leaked to attackers, and which also prevents even an authorized custodian from accessing the actual key to eliminate internal risks and the traditional need to constantly change the cryptographic keys and re-encrypt the data with staff changes or attrition.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
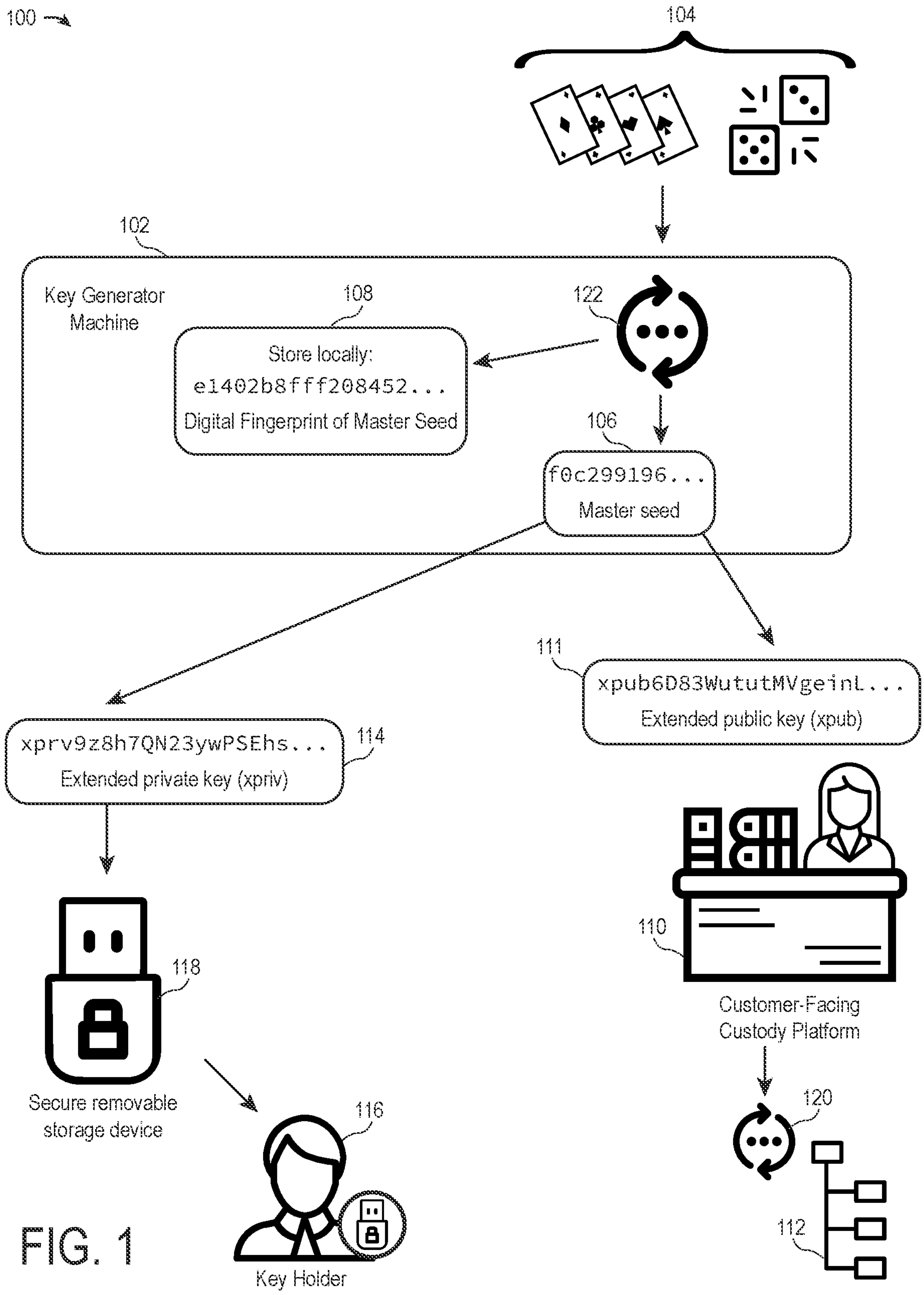
FIG. 1 is an overview diagram of a secure hardware cryptographic keystore in relation to a customer-facing custody platform in accordance with some embodiments. No process or technology behind the Customer-Facing Custody Platform ever needs to be exposed to the customer, they only ever see the assets in a wallet on the blockchain.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

To use a cryptocurrency, digital asset, or other blockchain based token, a user first has to generate pairs of keys for sending and receiving the digital assets. The pairs include a paired public key and a private key, also referred to herein as the spending key, that are generated as outputs of the same key generation process. The user can mathematically derive a payment address based on the public key to publish or transmit to any other entity, who can then pay the user in that digital asset or "coins" by constructing a valid spending transaction with the recipient's public key as one of the outputs of the transaction with the desired amount of coins to spend to the recipient's address specified in the transaction. The payment address can also be referred to as a user's wallet address.

To spend an amount of cryptocurrency coins stored at a payment address, the spender signs a spending transaction with the private key paired with the public key holding the funds to be spent. Any entity that possesses a private key may compose and sign a transaction spending the funds associated with the public key. One way of viewing the question of whether one "owns" a bitcoin or other cryptocurrency is to ask whether the owner is the only person who has a copy of the spending key. If the key were ever to leak or be disclosed in any manner, then the coins could be spent by an attacker and could thus be considered to have been stolen. It is therefore essential to the safe practice of storing cryptocurrency to keep the private keys secret.

It is essential to the practice of safe cryptocurrency custody that private keys not be lost because then the balance associated with the keypair address would be forever locked and considered unspendable. There is no chance of the owner of a lost private key guessing the key for the same reason it is not possible to guess the spending key of any cryptocurrency coins: it is computationally impractical to brute force the address space of the private key given real-world constraints of energy inputs and available computing power.

Private spending keys are safe from brute force attacks due to the vast size of their address space, but to reap the benefits of the size of this address space, a sufficient source of entropy must be supplied to any key generation process. An insufficient source of entropy could mean that newly generated key pairs are only being chosen from a subset of the entire address space. If the subset is small enough, an attacker could replicate their generation using the same or similar entropy source. Random number generation that is not true random number generation (e.g., random numbers generated on commodity hardware), for example, is frequently a source of insufficient entropy for key generation.

Sufficient entropy input may be sourced in various ways. It does not matter whether the entropy input originates with any particular source as long as that source generates a sufficient amount of entropy in relation to the available keyspace of the coin for which the keys are to be generated. Some ways to generate the appropriate, that can be used alone or in combination, include a shuffled deck of playing cards, rolling dice, an "electron waterfall" device produced by the TrueRNG company, entropy devices that sense environmental factors (e.g., sound, vibration, heat, etc.), input to a device (e.g., mouse and keyboard input, accelerometer input, camera, etc.). This solution requires entropy from multiple disparate methods to ensure the total entropy is adequate. In some blockchain implementations, the entropy source required is a minimum of 256 bits of entropy. Other entropy sources may be higher, depending on the cryptographic algorithms used by the blockchain for which the coins will be custodied.

When supplied with a sufficient source of entropy, key generation processes can produce a key pair compatible with the desired cryptocurrency. Often the software that runs nodes on a particular cryptocurrency is capable of generating the key pairs. Also, third-party wallets may be used to generate the keys pairs, as is known in the art.

Implementations of various cryptocurrencies differ, but at least for coins operating on a UTXO (unspent transaction output) model, it can be considered a best practice to generate a new wallet for every new receiving transaction rather than reusing a previously used address. Since sufficient entropy can be difficult to source, it may not be possible for cryptocurrency users to obtain it every time the user wishes to generate a new key pair.

A common way to address the issue of the potential unavailability of sufficient entropy is to use a hierarchical deterministic (HD) wallet. With an HD wallet, the entropy input generates a master seed that is human-readable and can be stored offline. The master seed deterministically generates an infinite tree of public/private key pairs. In this context, deterministically means that the master seed will always generate the same tree of key pairs. Thus, any wallet that receives the master seed will have spending access to any coins stored on the public keys generated by the master seed.

One way to implement an HD wallet with a seed phrase is described in Bitcoin Improvement Proposal 32 (known as BIP-32). BIP-32 includes generation of an extended private key (xpriv) and extended public key (xpub), which are generated based on the master seed, but only themselves can be used to generate the tree of public keys or the tree of private keys, respectively. Thus, it is possible to share only the set of public keys with an entity that does not have access to the master seed by sharing only the xpub with that entity. A master seed phrase is also a convenient way to guard against loss of the private keys. Since most HD-compatible wallets can input the master seed phrase and deterministically generate the same set of pairs of keys every time, a lost hardware wallet or malfunctioning or deleted software wallet need not mean the private keys will be lost. As long as the master seed phrase can be input into a new HD-compatible wallet, and any coins therein will be spendable.

Since a master seed gives anyone in possession the ability to reconstruct a wallet and spend any coins found inside, keeping the master seed secret is paramount. Any theft or exposure of the master seed would not just unlock a single payment address balance, it would unlock all the derived payment address balances generated by the hierarchical deterministic tree. The master seed on its own must be handled with high security since its compromise would mean custody of the crypto coins had failed.

Many users who are interested in buying, storing, and/or selling cryptocurrency are not up to the task of meeting the aforementioned requirements of safely handling the master seed and private spending keys and are not inclined to learn, in which case they must turn to a third-party custodian to keep their coins safe for them. In other scenarios, an entity may require third-party custody of cryptocurrency or other digital assets due to regulations or legal requirements (e.g., an entity buying and holding cryptocurrency on behalf of its customers, a crypto mutual fund, a Special Purpose Depository Institution designed to custody cryptocurrency, etc.). The third-party cryptocurrency custody providers are tasked with safe key generation and key protection so that the funds are spendable when the depositors or customers wish to move their funds.

Disclosed herein is a secure hardware cryptographic keystore that enables a cryptocurrency custody provider to safely generate wallet addresses and private spending keys to store cryptocurrency and to securely access the cryptocurrency when the owner wishes to withdraw. The secure hardware cryptographic keystore features a number of safeguards to protect against loss of funds. One safeguard is the distribution of spending power across a group of individuals such that no one person can unilaterally move funds as is common in "inside job" thefts of cryptocurrency custodians. One way to distribute the spending power across a group is through the use of a multisignature (multisig) wallet arrangement wherein a quorum of keys distributed to key holders is needed to spend. In another arrangement, useful for cryptocurrencies that do not natively support multisig, but usable on any cryptocurrency, is to "shard" the master seed and distribute the shards to shard holders such that a quorum of shard holders are needed to spend.

In both the sharded secret implementation and the multisig implementation, a quorum of participants need to have protected their keys in order to spend, but fewer than all key holders need to preserve their keys or shards. This arrangement guards against any key loss single point of failure, such as a key holder losing her key or becoming uncooperative or unavailable to the custodian. Thus, there can be no one particular key or shard that, if lost, would render the funds unspendable. Throughout this disclosure, use of the term key holder or shard holder should be understood to be interchangeable depending on whether the context includes multisig keys or shards of a master seed.

The secure hardware cryptographic keystore described herein is a novel arrangement of features that improves the safety of cryptocurrency wallet and key generation in the context of an institutional custodial service that is holding cryptocurrency on behalf of its customers. The custodied coins are at lower risk of theft or loss than in other hot/cold wallet systems including other multisig systems. Use of the encrypted mobile storage devices reduces risk of theft of any individual multisig key or shard, and spreading the keys or shards across a group, only a quorum of which is needed to spend coins, reduces risk of locked funds on the blockchain due to lost keys. Moreover, the layered encryption arrangement disclosed herein allows for swapping out of a key holder without the need to change the keys or concern over the loss of a key or shard storage device.

This arrangement is particularly suited to a company providing custody services of cryptocurrency on behalf of customers. The company likely has a group of employees who are the individuals authorized to spend blockchain funds. The authority to spend funds are not to be concentrated in a single individual because if that one person is compromised or incapacitated, the custodied coins could be lost. The history of cryptocurrencies since their inception has been heavily influenced by repeated insolvencies of companies providing custody for customers and loss of customer funds. Many of the insolvencies are due to breaches of the custodian's cold storage wallet due to a single employee being targeted or the individual pulling off the theft themselves since there was no check on their ability to move funds.

The techniques described herein avoid the problem of a single employee being able to move blockchain funds out of the cold wallet by spreading the authority over a group with a quorum feature. The quorum feature allows for access to the cold wallet funds even if one or more of the authorized employees is absent, incapacitated, no longer employed by the custodian, uncooperative, adversarial, or has lost access to her encrypted removable storage drive. Furthermore, the layered encryption methods used ensure that even the trusted employee does not have actual access to of the keypart or shard. As a result, it is no longer necessary to rotate keys when an employee leaves or changes roles, or even if a secure storage device is lost.

FIG. 1 is an overview diagram with a system 100 of a secure hardware cryptographic keystore in relation to a customer-facing custody platform in accordance with some embodiments. The system involves a secure key generator machine 102 that creates the master seed in a key generation ceremony and generates material to be distributed to a set of key and/or shard holders. Each member of the group of key holders is provisioned with a secure hardware storage device that can receive the key from the key generation machine. Later, when it is desired to spend from the wallet represented by the master seed, a quorum of key holders return to the key generator machine or, alternatively, a dedicated transaction signing machine, and upload the payloads from their secure storage devices to spend cryptocurrency funds.

The key generator machine 102 may be a computer with a terminal and input/output communication ports for carrying out the operations described herein. The terminal of the key generator machine 102 can receive various inputs from an operator via the terminal. The operator may be given a series of opportunities via the terminal to specify parameters of the key generation process such as address formats specific to particular coins, paths for creating hierarchical deterministic derivation trees, compliance with address formats (e.g., segregated witness addresses or bech32 on bitcoin), and other parameters described herein.

The key generator machine 102 may include various safety and security features for protecting the custodied cryptocurrency. In implementations, the key generator machine 102 is an air-gapped computer with respect to network communications. The term airgapping refers to the practice of booting a computer system that has no network communications capabilities. Examples of ways to create an airgapped computer system include building a system without network or communication hardware (e.g., an ethernet port, microphone, video camera, a Wi-Fi antenna, Bluetooth™ or other wireless communications protocol antennas, etc.). Another way that can be used instead of, or addition to, omitting network communication hardware from the system is to boot into an operating system that lacks software drivers to interface with the network communications hardware. A kernel of the Linux operating system for example could be compiled and booted that lacks the network communications hardware drivers.

A reason for disabling all network communications is to ensure that there is no leakage of the master seed, private key, secret shards, or any other sensitive information relied upon by the key generator. The lack of network and/or wireless communications reduces the attack surface of the key signing machine such that these avenues of access will not be available to an attacker trying to intercept information that will enable theft of the custodied coins (e.g., intercepting a private spending key, master restore phrase, sufficient quorum of sharing shards, etc.).

Other methods of increasing security involve disrupting wireless communications that could be used by an attacker trying to gain access to the key generator machine 102. The physical room that houses the air-gapped computer can be shielded such as with a Faraday cage, which is a type of enclosure used to block electromagnetic fields, to prevent wireless communications or electronic eavesdropping from devices located therein.

Additional security features that may be incorporated into the system include physical saferoom features and/or surveillance of the key generator machine 102. The custodian may implement safety and security policies including limitation of authorization of participants to enter the room with the device, not allowing a single participant to enter the saferoom alone, requiring keycard and/or PIN on the lock to the ingress door to the saferoom, requiring a quorum of key holders to unlock the door to the saferoom, etc.

To begin the process disclosed herein, an entropy source 104 is fed into the key generator 102 as the basis for some of the calculations described herein. As referenced elsewhere herein, the entropy should be sourced in a variety of ways, as long as it provides a sufficient number of bits of entropy such that it would not be possible to independently guess the input. In the example illustrated in FIG. 1, the entropy is sourced from a deck of playing cards and dice. Equipped with the entropy input, process 122 on the key generator machine 102 creates a master seed 106 that serves as the basis for the cryptocurrency wallet operations described herein. If the entropy source 104 has a sufficient number of bits of entropy, then the participants in the system will have a high confidence level that the master seed 106 is a seed that has never been used before and will never be used again.

Next, process 122 on the key generator machine 102 computes a digital fingerprint 108 of the master seed 106. The digital fingerprint 108 may be a hash digest of the master seed 106, for example a SHA-256 hash output. As is well known in the art, a cryptographic hash function takes an input and produces a fixed-length digest. The hash function is sometimes referred to as a one-way function because it is impossible to calculate the hash input given only the hash digest. Since an input will always result in the exact same output, the hash digest can be viewed as being a fingerprint of the input. In the present system, storing the master seed 106 permanently on the key generator machine 102 would compromise the security of the system because any attacker with access to the key generator machine 102 could generate the spending keys. Thus, the master seed 106 will be securely deleted from the key generator machine 102 at the end of the distribution process to the key holders. The fingerprint 108, however, will enable the key generator machine 102 and/or a signing machine, whichever is used to reconstruct the master seed at spending time, to verify that it has the correct master seed by computing the fingerprint 108 again and comparing it to the fingerprint 108 stored during the master seed creation process. In some implementations, the fingerprint 108 can be a truncated version of the hash digest because matching only some digits of the digest may be sufficient to show identity of the recreated seed.

A cryptocurrency wallet that can generate new public key addresses to receive cryptocurrency and generate the corresponding private keys needed to spend the coins in those public key addresses will generate both sets of keys based on the master seed. But the master seed may also be used to generate two other keys based thereon: an extended public key (xpub) and an extended private keys (xprivs). If in possession of an xpub, a participant in the system is only able to generate the hierarchical deterministic tree of public keys and is not able to generate the corresponding spending keys. This means the xpub can identify wallets by their addresses on the blockchain and allow anyone in possession of a copy of the blockchain (which is not difficult to obtain in the case of a public blockchain) to monitor the funding status and transaction history of any number of wallets in the hierarchical deterministic tree. These funds are in a "read-only" state from the perspective of a participant who only knows the xpub, thus sharing an xpub is considered a safe practice and the funds will not be at risk if the xpub is leaked, although leaking the xpub probably would be considered a privacy issue. An xpriv works in the same way as the xpub except the generated tree is of private spending keys instead of public payment keys. In many cryptographic systems, knowledge of a private key is sufficient to generate the corresponding public key. The reverse is computationally impractical, which is one of the main reasons why cryptocurrencies are secure from brute force spending attacks.

In the arrangement illustrated in FIG. 1, the xpub and xpriv are used to split permissions into two groups: (1) the Customer-Facing Custody Platform 110 receives the xpub 111 for "read only" access to the wallet, and (2) the Xprivs are distributed to the members of the group of key holders for "spending" access to the wallet. This arrangement allows for the Customer-Facing Custody Platform 110 to be aware of all of the cryptocurrency payment addresses associated with the wallet for purposes of calculating current balances and giving customers addresses for the customers to deposit cryptocurrency funds. The Customer-Facing Custody Platform 110 can perform operation 120 on the xpub 111 to generate address tree 112, which includes all of the deterministically generated payment addresses. If the Customer-Facing Custody Platform 110 needs to move cryptocurrency funds, such as to top off a "hot wallet" for customer withdrawals, then the spending power distributed across the group of key holders, including key holder 116, can be utilized to spend from the wallet as described herein.

To distribute the spending power in the system 100, each xpriv 114 is encrypted by the generator machine's encryption key and then and then copied to a secure removable storage drive 118 (e.g., PIN locked encrypted USB storage devices, also referred to herein as encrypted removable storage devices) and distributed to the key holder 116. Since the key generator machine 102 purposefully does not have network communications capabilities, the generated keys are copied from the key generator machine 102 via the input/output communication port to the secure removable storage devices. The secure removable storage devices can then be distributed to the members of the group of key holders who can provide their own custodianship of the secure devices but who do not actually have access to the xpriv since it is in an already encrypted format on the device.

The secure removable storage devices may have features that increase security in the event that the key holder individual is compromised, goes rogue against the custodian, or is attacked by an entity trying to steal the custodied coins. One suitable type of hardware for the removable storage device is a FIPS-certified hardware encryption device. If an incorrect PIN is entered multiple times or if the device detects tampering, the device can be configured to wipe the memory to avoid disclosure. Encryption of the secure removable storage device need not be done with asymmetric key cryptography, as is used in other parts of the system. Instead, symmetric key cryptography may be used with a key local to the secure removable storage device. A salt or passphrase may be used in conjunction with the symmetric key to encrypt and decrypt the payload contents. An effective way to supply the passphrase is in the form of a PIN code known only to the key holder (e.g., selected by the key holder and not shared with any other participants). The secure removable storage device may include a keypad for the key holder to select the PIN and later to enter the PIN when it is desired to decrypt the content of the device for performing the actions described herein such as copying the payload to the device or reading the payload from the device.

For an additional layer of security, the payload on each of the removable secure storage devices is itself be encrypted before it is copied from the air-gapped key generator machine to the removable secure device. Instead of merely copying the payload (e.g., xpriv, secret sharing shard, etc.) to the removable storage device in cleartext, such that it could be accessed by the key holder in possession of the device by entering the PIN or passphrase to decrypt the payload, the payload can be first encrypted with the facilitator's key (e.g., an operator of the air-gapped key generator machine). The payload encrypted with the facilitator's key can be copied to the removable storage device, which then encrypts the payload again with its own local encryption key. If the key holder decrypts the contents of the removable storage device in secret, what is revealed with only be the encrypted "blob" encrypted with the facilitator's key on the air-gapped key generation machine, and will not be of any use to an attacker trying to gain access to the custodied funds protected by the system. This arrangement protects against unintended leaking of the payload on any particular secure storage device in the event of attack by an outsider or by the key holder herself and prevents the significant business effort and cost required to generate and rotate keys whenever a designated key holder changes.

Figure 2:
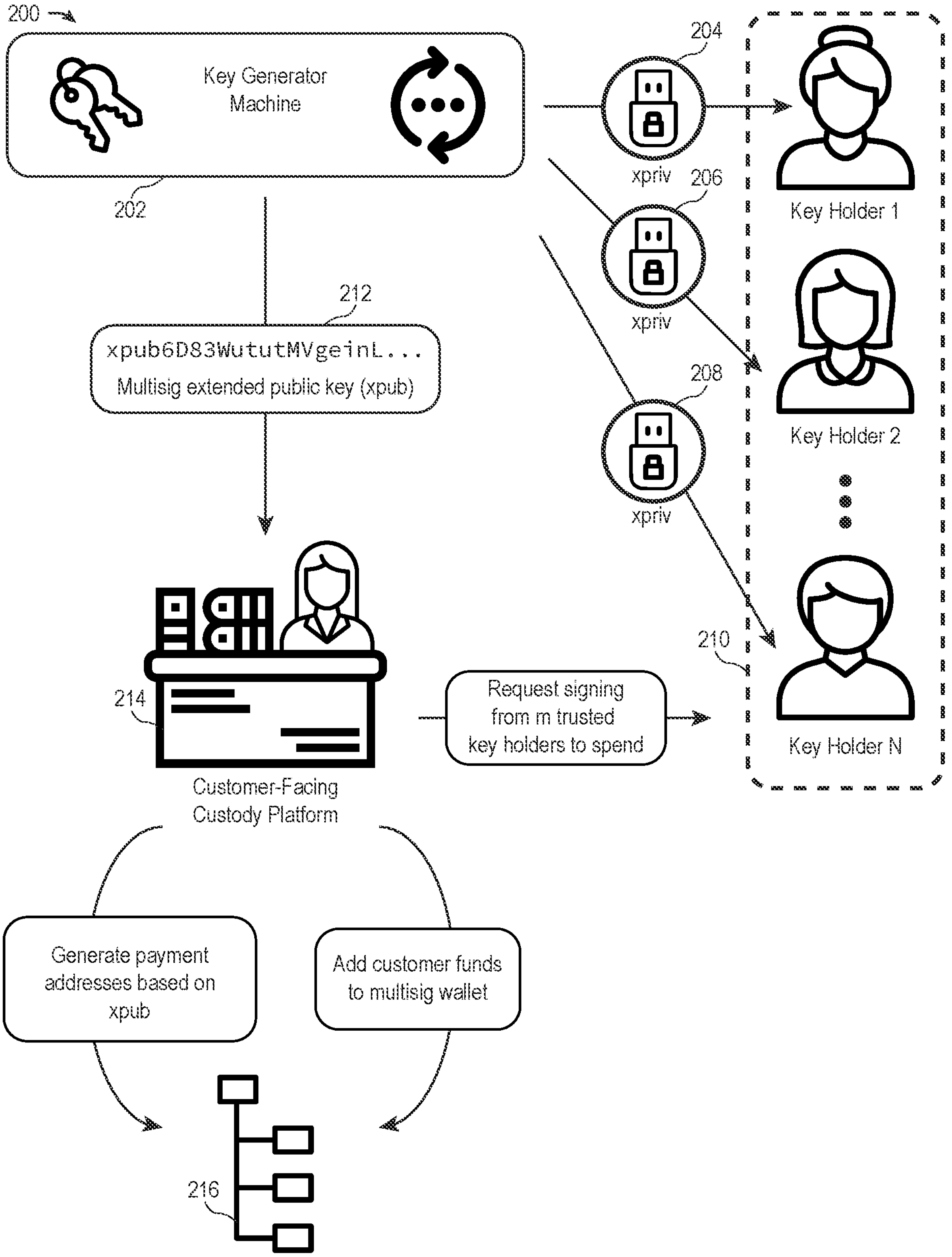
FIG. 2 is a diagram of a secure hardware cryptographic keystore preparing and distributing encrypted key parts on secure storage devices to a group of key holders to custody spending keys for a blockchain that natively supports multisignature (multisig) wallets.

FIG. 2 is a diagram of a secure hardware cryptographic keystore preparing and distributing removable storage drives 204, 206, 208 to a group 210 of key holders for custodying spending authority for a blockchain that natively supports multisignature (multisig) wallets. One important aspect of the disclosure herein is that some cryptocurrencies, like bitcoin and forks thereof, natively support multisig. Natively supporting multisig means that the protocol itself allows for encumbrances on unspent funds that can be unlocked when m-of-n spending keys sign a transaction. The arrangement illustrated in FIG. 2 is particularly suited for chains that natively support multisig. The key generator machine 202 creates the encumbrance or locking script that satisfies the desired m-of-n unlocking condition desired by the facilitator of the system 200.

In the example illustrated in FIG. 2, the group 210 of key holders are identified and are each provisioned with an encrypted removable storage drive 204, 206, 208 to store a spending key (e.g., a single key or an extended private key from which many spending keys can be derived). The secure removable storage drives load the payload from the key generator machine 202 through an input/output communications port in the machine and are carried out of the secure location housing the key generator machine 202 in the personal possession of the respective key holders.

In this way, true custodianship of the customer funds is not concentrated in a single individual or in a single physical place. Compromising the system would involve breaching the security of a quorum of key holders all at the same time or collusion among a quorum of key holders, which is far less likely than a single individual deciding to attempt to steal the custodied keys. Additionally, even collusion among a quorum of keyh holders is mitigated as the layered encryption requires that the secure removeable storage devices must be reconnected to the airgapped key generator in order to be decrypted and used. The security provided in this manner is adjustable because the custodian can select any size group of key holders, any fraction of which may be selected to satisfy the quorum requirement. As the group of key holders increases, and the number of key holders needed to satisfy the quorum increases, the risk of loss or theft of funds decreases to an exceptionally low level.

An important feature of this secure hardware cryptographic keystore is that one member of the group of key holders may be swapped out for another member because the key or shard was never actually exposed to the previous key holder. This can be useful when the key holders are employees of the custodian and one of the key holders quits the employment and is replaced by a new employee. In this scenario, the departing employee can enter the PIN code into the secure removable storage drive and reprogram to the PIN of the new employee. Another option is to have multiple instances of a secure removable hardware device such that if a departing employee loses or destroys her device, a backup encrypted blob can be copied to another device.

After distributing the spending keys to the group 210 of key holders, the key generator machine 202 can distribute the extended public key (xpub) 212, which is generated in the same process that generated the xprivs, to the Customer-Facing Custody Platform 214. The Customer-Facing Custody Platform 214 uses the xpub to generate a tree 216 of deposit addresses that can be used with the customers of the platform to deposit cryptocurrency into payment addresses that can be later spent by a quorum of the group 210 of key holders. In implementations, the extended public key 212 is a multisig xpub, which is a specific type of xpub that takes multiple sigs to converge on the ECDSA point recognized as a valid signature for an m-on-n multisig.

Figure 3:
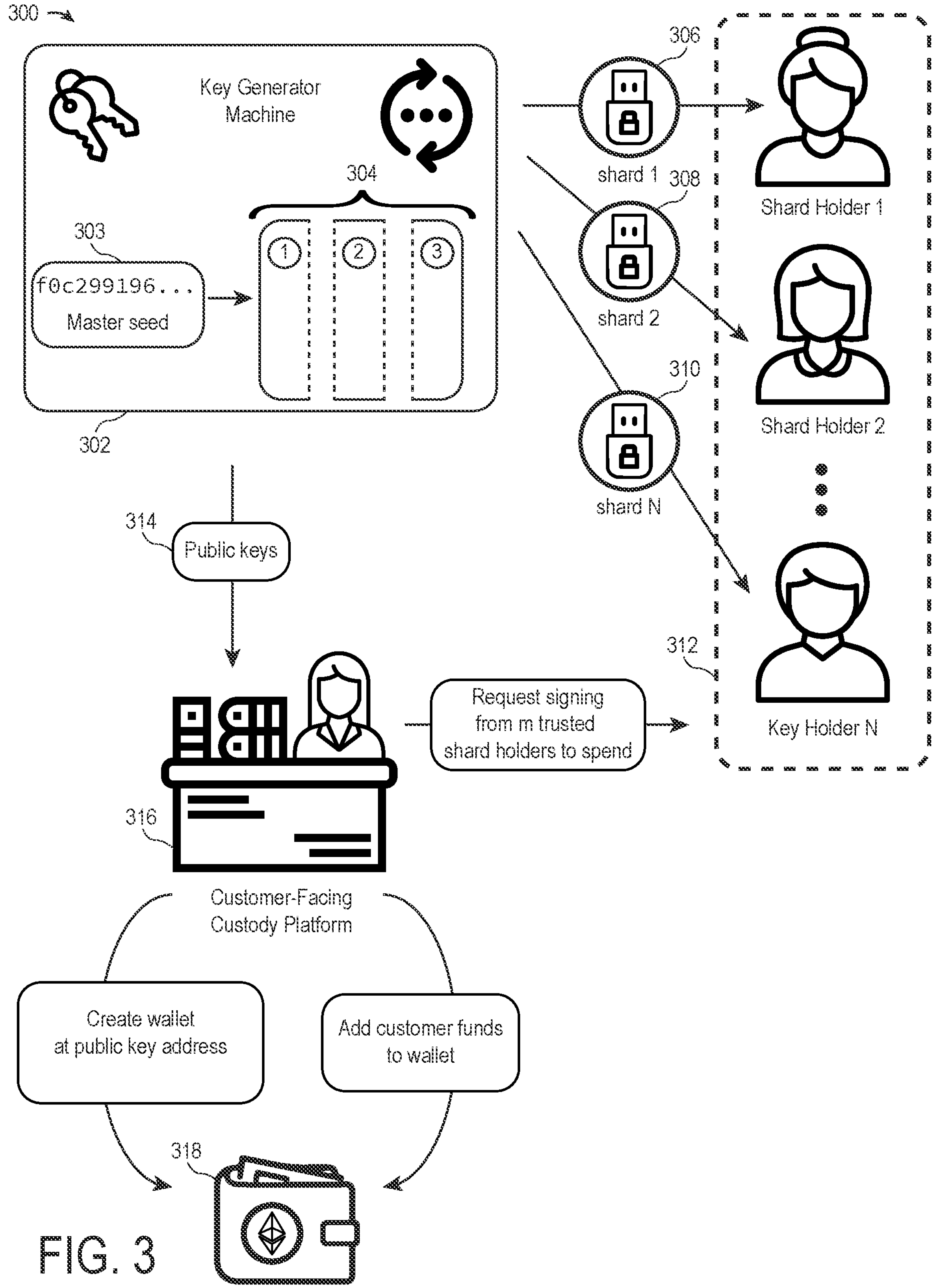
FIG. 3 is a diagram of a secure hardware cryptographic keystore preparing and distributing a set of shards of a cryptocurrency master seed to a group of shard holders in accordance with some implementations where the blockchain does not natively support multisig.

FIG. 3 is a diagram 300 of a secure hardware cryptographic keystore preparing and distributing a set of shards 304 of a cryptocurrency master seed to a group 312 of shard holders. The arrangement illustrated in FIG. 3 is particularly advantageous for cryptocurrencies that do not support ative multisig functionality. In other words, the protocol of the cryptocurrency may not itself enable an encumbrance on funds that can be removed with the m-of-n signature scheme described elsewhere in this disclosure. If users of a non-native multisig cryptocurrency wish to utilize multisig functionality, one way to do so would be to rely only on a single signature (single sig) from the perspective of the currency itself and to split and share the master seed among the key holders such that a quorum of shares are sufficient to re-create the single signing key. This approach is referred to herein as sharding, which may apply to sharding a single sig spending key or sharding a master seed that can be used to deterministically generate a set of single sig spending keys. Other approaches to introducing multisig functionality into a protocol that does not natively support it, such as implementing the multisig encumbrance in a smart contract that holds funds and only dispenses the funds when a quorum of a group sends a blockchain transaction to the smart contract address, are purposefully avoided in the present disclosure due to the security risk introduced by a potential bug in such a contract and because running the multisig on-chain will incur blockchain transaction confirmation costs (e.g., paying gas costs on the ethereum network) that are not present in the off-chain process disclosed herein.

One way to shard the master seed is known as Shamir's Secret Sharing Scheme (SSSS or S4), a clever arrangement first proposed by Adi Shamir in 1979. S4 is a form of secret sharing where the secret, here the master seed phrase, is divided into shards in a way that less than the total number of shards is needed to reconstruct the secret. If one or more of the shards generated according to S4 are lost, it will still be possible to reconstruct the master seed, restore the wallet, and access and spend the custodied coins. S4 thus presents a way to diversify reliance across the shards and minimizes risk of loss.

Sharding a single master seed confers most or all of the advantages of using a cryptocurrency with native multisig functionality. Each shard can be distributed to a key holder for safekeeping until it is desired that the coins in the single sig wallet be moved in the future. The key holder could be viewed in this context as being a shard holder rather than a key holder, but for consistency this disclosure will refer to both shard holders and key holders as key holders.

In the naïve implementation, the single spending key or master seed could be sliced into a number of parts such that all parts would need to be concatenated together to restore the single sig spending key or master seed phrase. Disadvantages of this arrangement are that, if a single key holder loses her encrypted storage device holding the key, then any funds held in the wallet will be locked there permanently. Thus, simply dividing the single sig spending key into parts is not a robust safety solution and lacks the feature of being able to spend from the wallet with only participation of a quorum of key holders and not the entire group of key holders.

FIG. 3 illustrates an S4-style sharding scheme wherein the master seed is sharded into N shards 306, 308, and 310 on secure removable storage devices 306, 308, 310, which are distributed to the group of keyholders 312, with N key holders. S4 can be configured such that only M key holders (M<N) are required to reunite their shards in order to successfully re-create the master seed 303 and thus have access to the funds in the single sig wallet.

At key generation time, the key generator machine 302 can supply a wallet public key 314 or set of wallet public keys to the customer-facing custody platform 316. The customer-facing custody platform 316 can use the wallet public key or set of wallet public keys to store customer funds in the wallet 318. Revealing only the wallet public key 314 to the customer-facing custody platform 316 is not a security risk because the coins will not be able to be spent using only the wallet public key if the attacker does not also possess the corresponding private spending key.

When the customer-facing custody platform 316 desires to spend coins from the wallet, it can request shards from M of the key holders of the group 312 to re-create the necessary spending key. In this way, an effective multisig arrangement can be provided on a blockchain that does not natively support it without resort to implementing the multisig in a smart contract which introduces loss of funds bug risks and gas costs for processing transactions from the M key holders.

After the N shards 306, 308, 310 have been distributed to the group of key holders 312, the key generator machine 302 can perform certain clean-up tasks to prevent the leakage of the master seed 303. These tasks can include taking a digital fingerprint of the master seed 303 for later reference and securely deleting the master seed 303 from the memory of the key generator machine 302 such that, if an attacker were to gain access to the machine 302 later, the master seed 303 would not be recoverable. The stored digital fingerprint will not put funds at risk, since it would not be possible to calculate the master seed 303 from the fingerprint alone, but the fingerprint will allow the spending process to verify that it has reconstructed the correct master seed by computing the fingerprint again and comparing it to the stored fingerprint.

Figure 4:
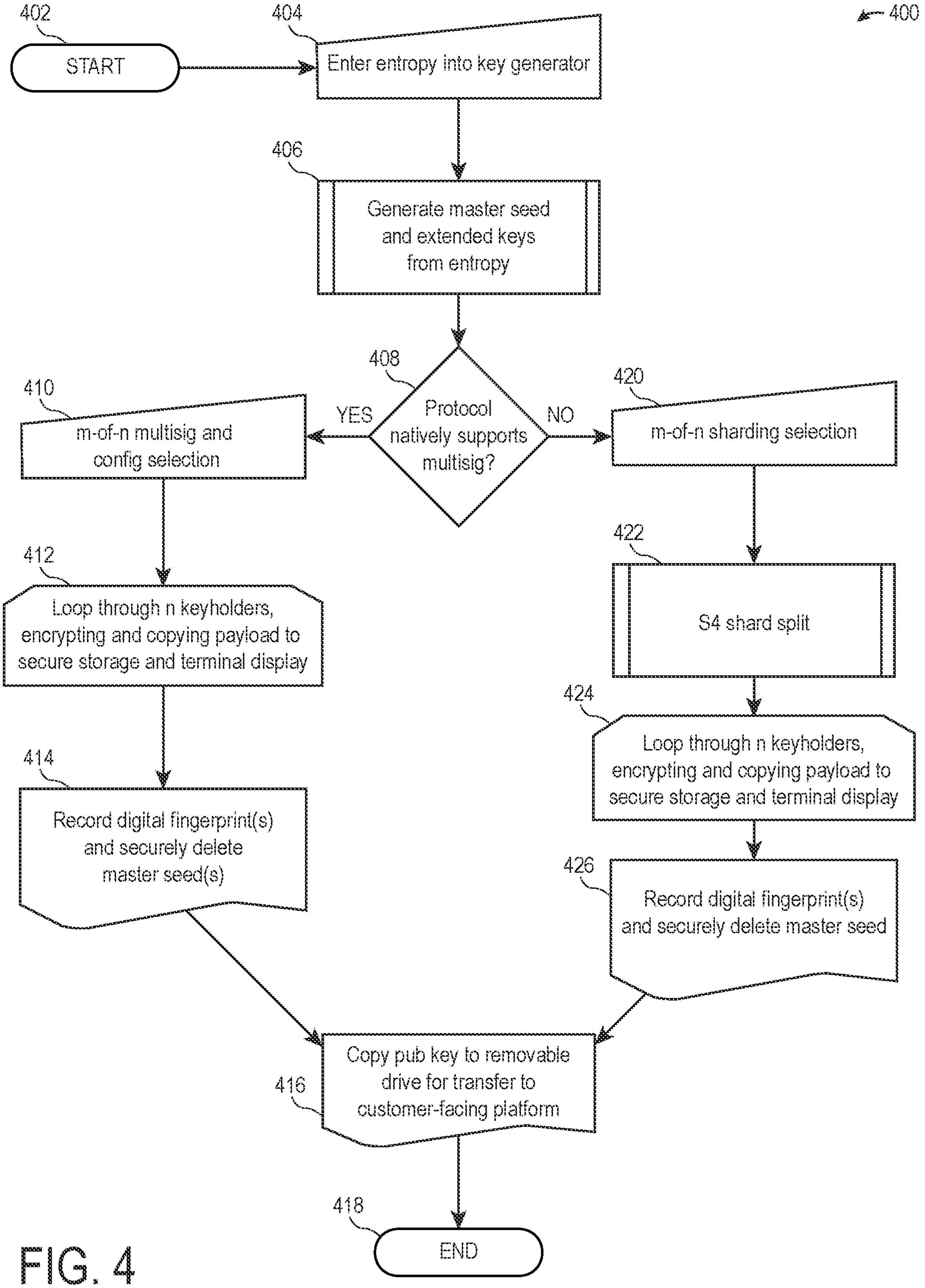
FIG. 4 is an example workflow for creating either a set of cryptocurrency multisignature (multisig) wallet private keys for distribution to a group of key holders or a set of master seed shards for distribution to a group of shard holders in accordance with some blockchain implementations where multisignature is not natively supported.

FIG. 4 is an example workflow 400 for creating either a set of cryptocurrency multisignature (multisig) wallet private keys for distribution to a group of key holders or a set of master seed shards for distribution to a group of shard holders. The workflow starts at operation 402 and proceeds to operation 404, wherein the key generator receives an entropy source. Operation 406 generates a master seed and extended keys based on the entropy.

Decision block 408 depends on whether the cryptocurrency to be custodied natively supports multisig. If the cryptocurrency does support multisig, then the workflow proceeds to operation 410, which is the m-of-n multisig and config selection. An operator of a key generator machine may make the multisig selection via a terminal of the machine or it may be automated based on the blockchain protocol being specified. The configuration can include selection of the type of payload to be loaded onto the secure devices and distributed to the key holders. For example a single xpriv could be used to generate each of the signing keys, which would then be individually distributed to the group. Another configuration would be to generate a separate xpriv for each key holder such that the first deterministically generated key would be a signing key for the multisig wallet but that subsequent keys in the deterministic tree could be signing keys for additional multisig wallets. In this way, a single secure removable storage device and key holder could serve a signers on multiple multisigs. Whatever configuration is chosen, the relevant parameters are stored for later at spending time.

Next, operation 412 iterates through each generated key, encrypting it with the key generating machines encryption key, prompting each key holder to insert the key holder's secure removable storage device into the key generation machine (e.g., via a message displayed on the terminal) and copies the payload. As explained above, the payload can include an xpriv, a single signing key, etc., depending on the configuration selected in operation 410. Other elements of the payload may include a copy of the digital fingerprint of the master seed for verification at spending time. When the loop at operation 412 is finished, operation 414 records the digital fingerprint of the master seed(s) and securely deletes the master seed(s) and any other information related to signing transactions such as the xprivs. In implementations there could be more than a single master seed. Next, operation 416 copies the xpub to a removable storage drive for transfer to the customer-facing platform and the workflow ends at operation 418.

If the workflow 400 is applied to a cryptocurrency that does not natively support multisig, then the workflow branches at decision block 408 to operation 420, in which the facilitator can select the m-of-n sharing configuration (e.g., via the terminal). Operation 422 is the S4 shard split, which creates the desired N shards. Operation 424 is a looping operation that cycles through the key holders encrypting and copying the respective payloads to their secure removable storage drives (e.g., the respective shards, digital fingerprint of the master seed, etc.). Operation 424 can be accompanied by terminal display (e.g., displaying instructions to the key holders, status of the looping operation, etc.). Operation 426 records the digital fingerprint of the master seed and securely deletes the master seed. The workflow then executes operation 416 to copy the public key to a removable drive for transfer to the customer-facing custody platform and ends at 418.

Figure 5:
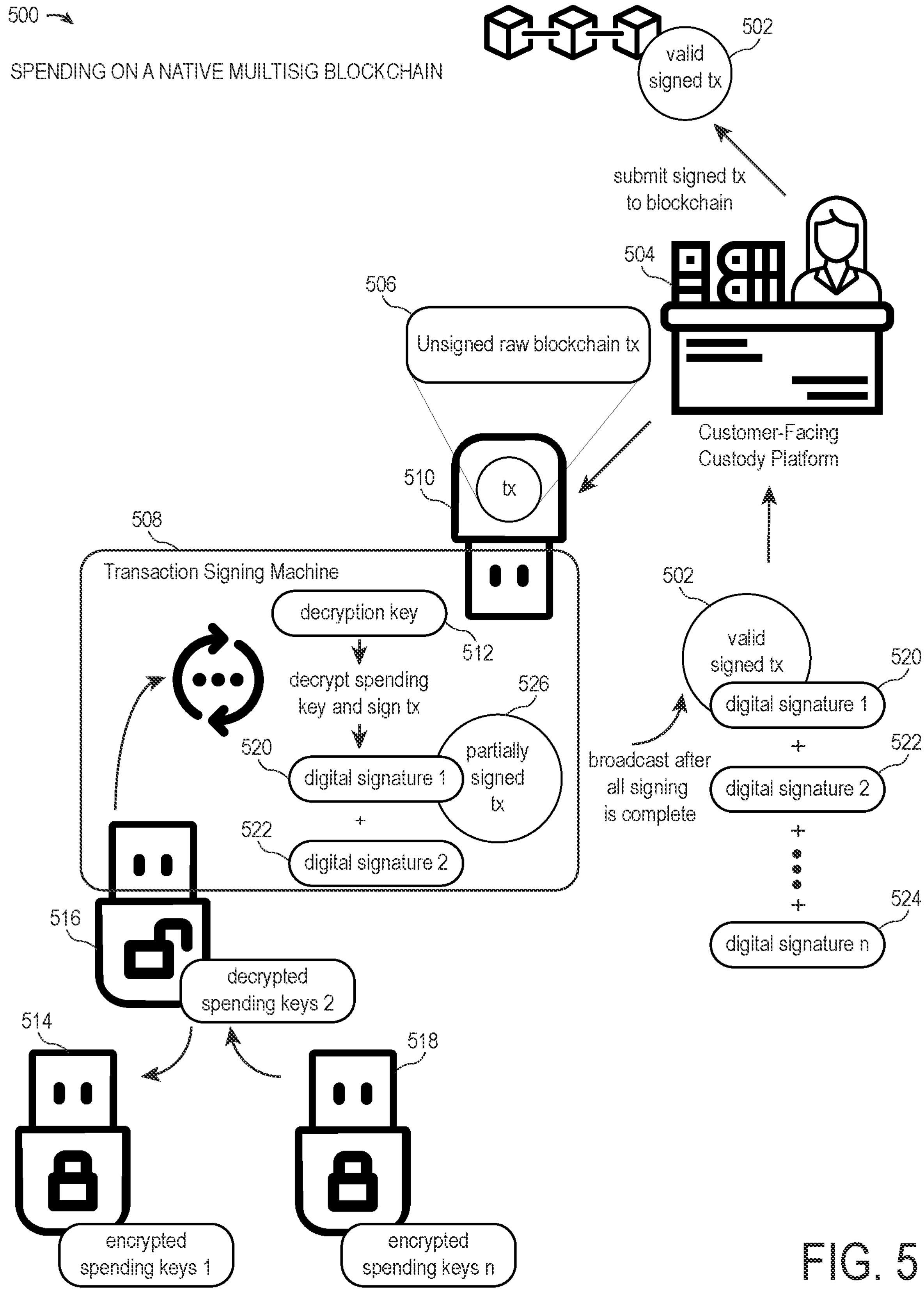
FIG. 5 is a diagram of a secure hardware cryptographic keystore signing a blockchain transaction with a quorum of keys to spend from a multisig cryptocurrency wallet in accordance with some blockchain implementations.

FIG. 5 is a diagram 500 of a secure hardware cryptographic keystore signing a blockchain transaction 502 with a quorum of keys to spend from a multisig cryptocurrency wallet. The operations illustrated in FIG. 5 support typical customer-facing custody platform arrangements that employ a "hot wallet" and a "cold wallet." The majority of the coins held in custody are held in the cold wallet according to the secure hardware cryptographic keystore described herein due to the excellent level of security it provides. As is common with cryptocurrency security, what is the safest is usually not also the most convenient. Withdrawals from the cold wallet may not be processed unless there is a quorum of key signers physically present and participating in signing the blockchain transaction that moves funds from cold storage, which may not always be readily available. Spending funds from the cold wallet is usually therefore not a frequent occurrence and may be planned ahead for coordination purposes with the key holders.

The hot wallet may also be employed that does not have the security guarantees of the cold wallet secure hardware cryptographic keystore but that is easier and faster to spend from (e.g., a single sig wallet or a multisig with a lower quorum fraction where the keys are stored in a more accessible but less secure location). As customers deposit and withdraw cryptocurrency from the platform, most or almost all of the requests will be fulfilled from the hot wallet and it will not be necessary to touch the cold wallet funds. If a period of time passes wherein deposits into the hot wallet outweigh withdrawals, or vice versa, funds in the hot wallet will become too large or too small relative to the cold wallet. If the hot wallet is too large, a rebalancing payment to the cold wallet is possible based on the xpubs provided to the platform. If the hot wallet funds become too small, on the other hand, a rebalancing operation to top the hot wallet up will need to be spent from the cold wallet.

In such a "top up" transaction, the customer-facing custody platform 504 constructs an unsigned blockchain transaction 506 spending inputs from an address on the xpub tree to a payment address that is part of the hot wallet. The unsigned blockchain transaction 506 for a particular cryptocurrency may be created on an instance of the peer-to-peer node software that updates the shared blockchain ledger of that cryptocurrency. Node software may have a command line interface or a graphical interface that allows the operator to construct a blockchain transaction identifying particular unspent transaction outputs from the xpub tree to use as inputs and specify the output of the transaction (e.g., the hot wallet). A blockchain transaction formulated in this way cannot be signed because the customer-facing custody platform does not know the xpriv and cannot generate spending keys on its own.

Once the unsigned blockchain transaction 506 (e.g., the hot wallet top-up transaction) has been constructed by the customer-facing custody platform 504, it can be transferred to the transaction signing machine (which is likely the same as the key generator machine) 508 on a transaction delivery removable storage media 510 and communicate with the blockchain transaction signing machine 508 via an input/output communications port. As with the key generator machine, the transaction signing machine 508 is an air-gapped machine with no network access and, in particular, no access to the public internet. The removable storage media 508 used to deliver the unsigned blockchain transaction need not have as high a level of security as the removable storage drives distributed to the key holders, but any of the techniques taught herein with respect to the key holder removable storage drives would also apply to the transaction delivery removable storage device 510 with the unsigned blockchain transaction 506. Although it does not constitute a secret like other components disclosed herein (e.g., master recovery seed, private key, xprivs, etc.), the unsigned blockchain transaction could still be the target of an attack if an attacker replaced the unsigned raw blockchain transaction 506 with a different transaction with her own payment address. The transaction delivery removable storage device 510 should therefore be kept safe and free from compromise. One feature in particular that may be useful with respect to the transaction delivery removable storage device 510 used to deliver the unsigned blockchain transaction 506 is a BIOS protected drive that will not install malware or run security breaching computer code on the air-gapped blockchain transaction signing machine 508.

The transaction delivery removable storage device 510 may actually deliver more than one unsigned blockchain transaction 506 to process in a single signing session. The blockchain transaction signing machine 508 may perform a validity check to verify the transactions 506 are valid on the blockchain of the cryptocurrency to which they will be broadcast after signing. The blockchain transaction signing machine 508 may further display to an operator at a terminal each of the loaded unsigned blockchain transactions for confirmation before the signing process is allowed to proceed.

Next, the operator of the blockchain transaction signing machine 508 inserts another secure removable storage drive (not shown) to load the decryption key 512. This operation is needed since the payloads on the secure removable storage devices 514, 516, 518 held by the key holders are themselves encrypted before being loaded onto the removable storage devices. Loading the decryption key 512 can also include the operator entering a passphrase and/or salt used to decrypt the payloads.

Based on the loaded unsigned blockchain transactions 506, the blockchain transaction signing machine may iterate across the group of key holders by prompting each key holder to supply the individual's secure removable storage drive. In one implementation, the cryptocurrency is bitcoin or another coin with native multisig support. On these coins, the unsigned raw blockchain transaction 506 itself will show how many signatures are needed for a quorum and the total number of existing keys. In other words, if the multisig encumbrance on the funds is a 4-of-7 multisig, the fact that 4 key holders must sign out of a total of 7 will be evident from examining the transaction 506. Also evident from examining the unsigned transaction is the public keys that constitute the group from which the quorum may be chosen. The terminal of the blockchain transaction signing machine 508 may display this information on the terminal such that the present key holders may be selected in turn.

As each present key holder takes a turn, the key holder inserts her respective secure removable storage drive into the input/output port, the signer approves the transactions via the terminal, the payload of the secure removable devices 514, 516, 518 is copied into the signing machine's memory. The payloads of the secure removable storage devices 514, 516, 518 are themselves encrypted during creation and distribution to the key holders. Thus each set of spending keys in the multisig is actually encrypted twice: once by the key generation machine with the decryption key 512 and then again by the secure removable devices 514, 516, 518 themselves. The double encryption arrangement increases security because if a key holder goes rogue and performs an unauthorized decryption of the content on her secure removable storage device, the result will itself be an encrypted blob that should not be of use to anyone who does not possess the decryption key 512, which can be kept secret from the members of the group of key holders. Various features are disclosed for the decryption of the secure removable storage devices 514, 516, 518 such as entering a PIN code chosen by the key holder, entering a passphrase directly on the secure removable storage devices 514, 516, 518 by the key holder, entering a biometric of the key holder (e.g., facial recognition, thumbprint, etc.). The decryption can be made when the secure removable storage devices 514, 516, 518 are inserted into the input/output port of the transaction signing machine 508 as is illustrated by secure removable storage device 516 in FIG. 5.

As the secure removable storage devices 514, 516, 518 are supplying signing keys 520, 522, 524, the transaction signing machine 508 signs the raw blockchain transaction 506 to yield the partially signed blockchain transaction 526 and eventually, after a quorum of signing keys have been provided, the valid signed blockchain transaction 502. The process facilitator can then remove the valid signed blockchain transaction 502 from the transaction signing machine 508, such as through the transaction delivery removable storage 510, to the Customer-Facing Custody Platform 504, which can then broadcast the valid signed blockchain transaction 502 to a network of the blockchain, which will, when mined, move the custodied cryptocurrency funds to the desired hot wallet or any other destination desired by the Customer-Facing Custody Platform 504.

Figure 6:
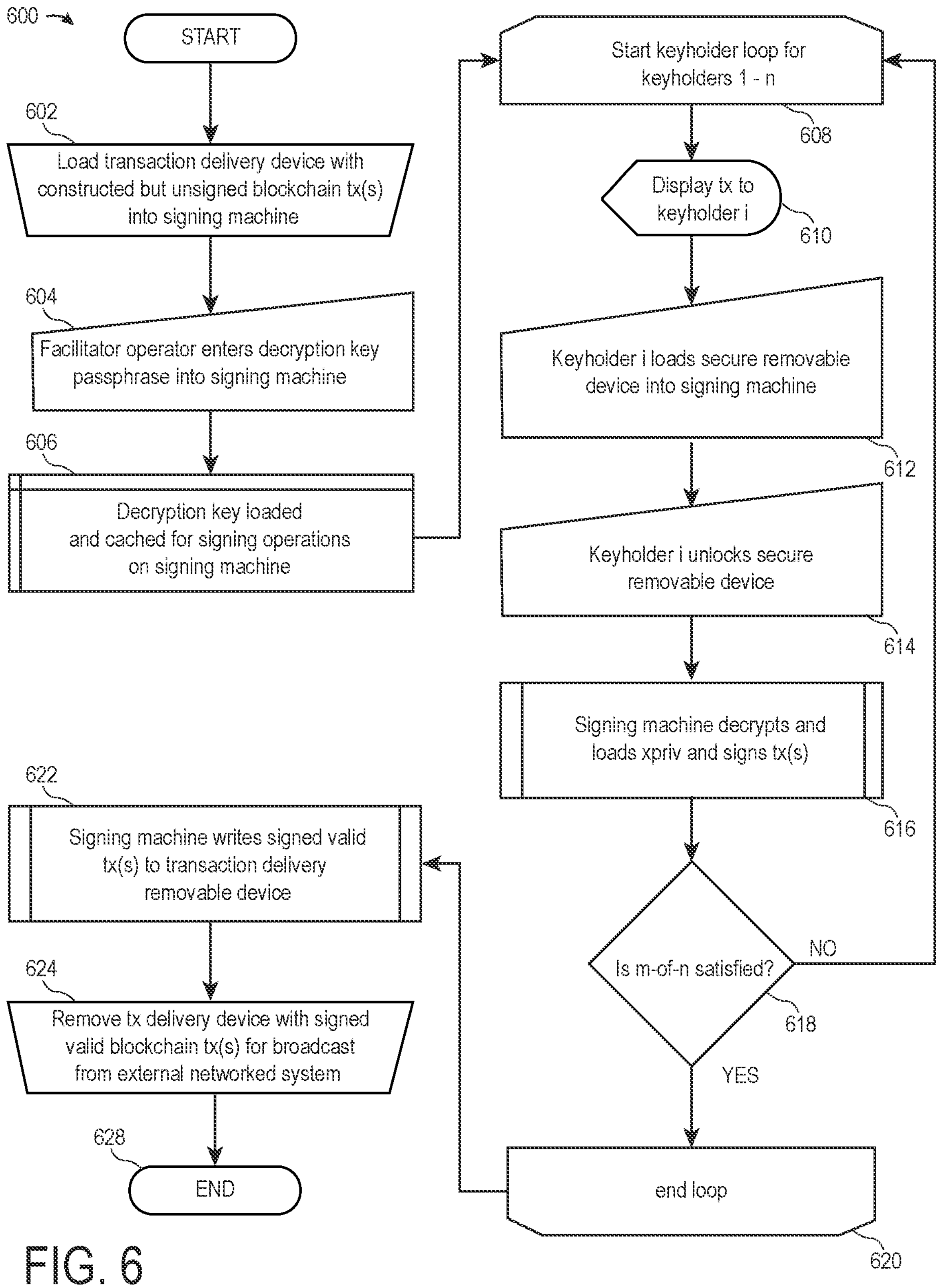
FIG. 6 is an example workflow for signing a blockchain transaction with a quorum of keys to spend from a multisig wallet in accordance with some blockchain implementations.

FIG. 6 is an example workflow 600 for signing a blockchain transaction with a quorum of keys to spend from a multisig wallet in accordance with some implementations. Elements of the workflow 600 can be carried out on an air-gapped blockchain transaction signing machine with a terminal to display information and accept configuration and user input. At operation 602 in the workflow, the transaction signing machine accepts a transaction delivery device with a constructed but unsigned blockchain transaction, such as a transaction for topping up a hot wallet on a customer-facing custody platform. At operation 604, a facilitator, who may be a person responsible for guiding the participants (e.g., the key holders) through the process described herein and can also be an operator at the terminal of the transaction signing machine, enters a decryption key, passphrase, or other decryption means into the signing machine. The entered decryption key can be a key capable of decrypting the payloads of the secure removable storage devices. The decryption key entered at operation 604 should not be confused with the encryption carried out locally on the secure removable storage devices, which, when applied, is encrypting the actual signing keys twice. The decryption key entered in 604 may be a key that was created and/or used by a key generation machine as part of a key generation and distribution ceremony. At operation 606, the decryption key is loaded for use in the operations described herein.

At operation 608 starts a loop through the key holders 1 through N. The loop includes example steps for receiving the keys from each key holder in the group. At operation 610 the terminal displays the transaction to the key holder. Other information can also be displayed including but not limited to the amount of coins to be spent, recipient address, timelocks or other transaction encumbrances, how many and which key holders have already signed the transaction, the identity of others in the group of key holders, etc. At operation 612 the key holder loads her secure removable device into the signing machine. 614 is an approval from the key holder that can include decrypting the first level of encryption on the payload of the secure removable device. 614 can include entering a PIN, passphrase, biometric or other gatekeeping mechanism known or available only to the key holder such that the device cannot be decrypted if stolen. At operation 616 the signing machine decrypts the second level of encryption of the payload, which is encryption with the key loaded in 604 and adds a signature with the newly decrypted key to the raw blockchain transaction.

If the quorum of m signers has been satisfied at operation 618, then the loop ends at operation 620. If the quorum m has not been satisfied, then the workflow returns to 608. After the signing loop is over, the transaction signing machine writes the signed at operation 622, now valid, blockchain transaction to the transaction delivery device loaded at operation 602. The facilitator can then remove the transaction delivery device with the signed, valid blockchain transaction for broadcast to a network of the blockchain by the customer-facing custody platform at operation 624. The spending workflow then ends at operation 628.

Figure 7:
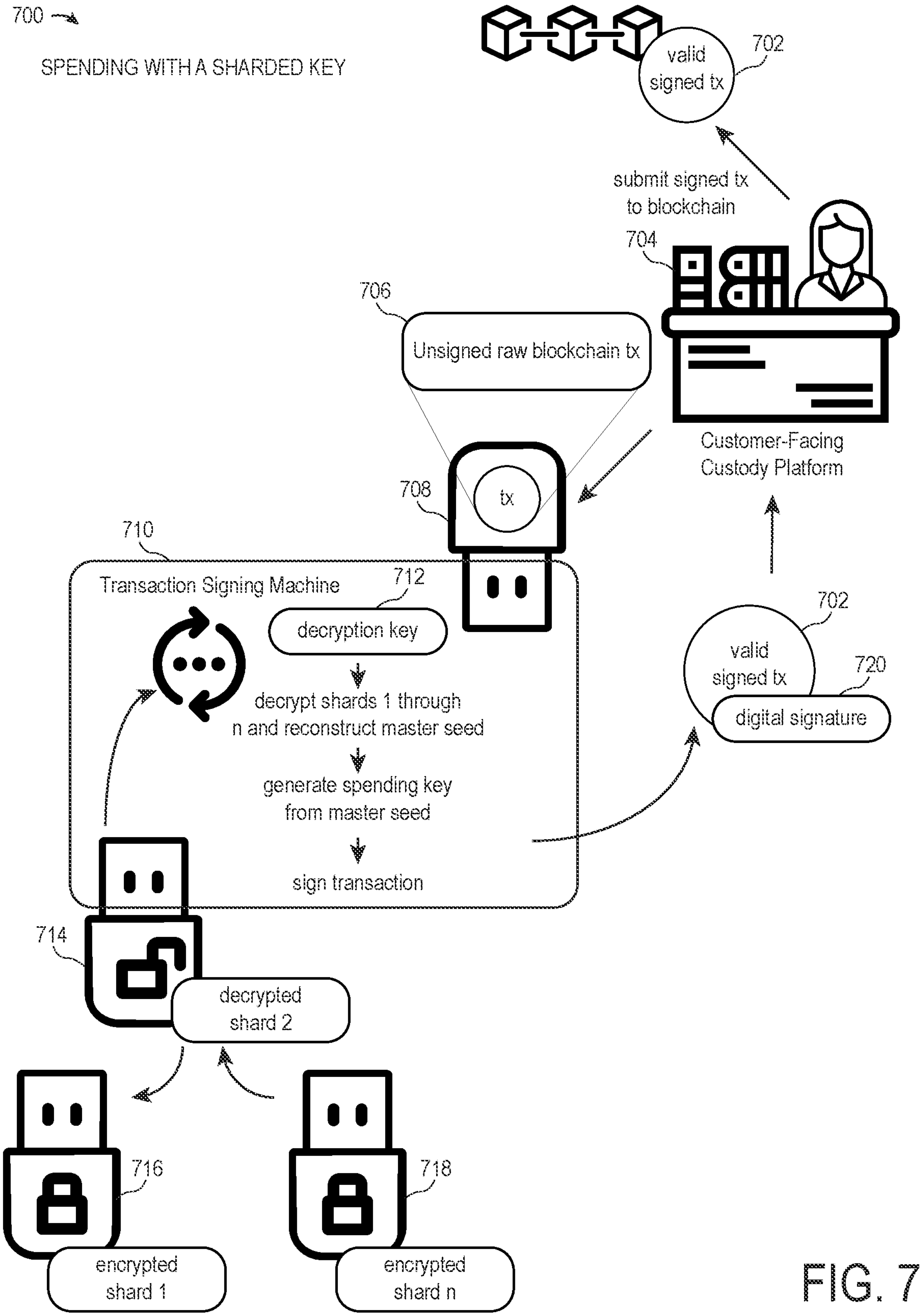
FIG. 7 is a diagram of a secure hardware cryptographic keystore signing a blockchain transaction with a quorum of shards to spend from a cryptocurrency wallet on a blockchain without native multisig support in accordance with some blockchain implementations.

FIG. 7 is a diagram 700 of a secure hardware cryptographic keystore signing a blockchain transaction 702 with a quorum of shards to spend from a cryptocurrency wallet on a blockchain without native multisig support in accordance with some implementations. The arrangement illustrated in FIG. 7 is similar to the arrangement of FIG. 5 in that a customer-facing custody platform 704 wishes to broadcast a valid signed blockchain transaction 702 to a network of a blockchain to spend from a cold wallet. The difference from FIG. 5 is that the cold wallet was created by sharding the master seed instead of natively implementing a multisig. The customer-facing custody platform 704 creates an unsigned raw blockchain transaction 706 spending from a cold wallet address, such as a cold wallet address generated from an xpub. The unsigned raw blockchain transaction 706 is delivered to the transaction signing machine 710 via the transaction delivery device 708.

The transaction signing machine includes a decryption key 712 that is supplied by a facilitator or stored on the signing machine 710. The signing machine 710 can direct, for example via the terminal, members of the group of key holders to insert their secure removable storage devices 714, 716, 718 (e.g., one at a time) into the input/output port of the transaction signing machine 710. As each secure removable device is inserted, the key holder decrypts the payload shard, as illustrated by secure removable device 714 (e.g., entering a PIN, passcode, biometric, etc.). The transaction signing machine 710 decrypts the second layer of encryption with the decryption key 712 for each of the shards 1 through N and generate the master seed based thereon (e.g., using S4). The master seed can then be used to regenerate the spending key, which can sign the transaction 702 with digital signature 720. The valid signed transaction 702 can be supplied back to the customer-facing custody platform 704 and broadcast to the network of the blockchain to spend the custodied funds (e.g., to top off a hot wallet).

Figure 8:
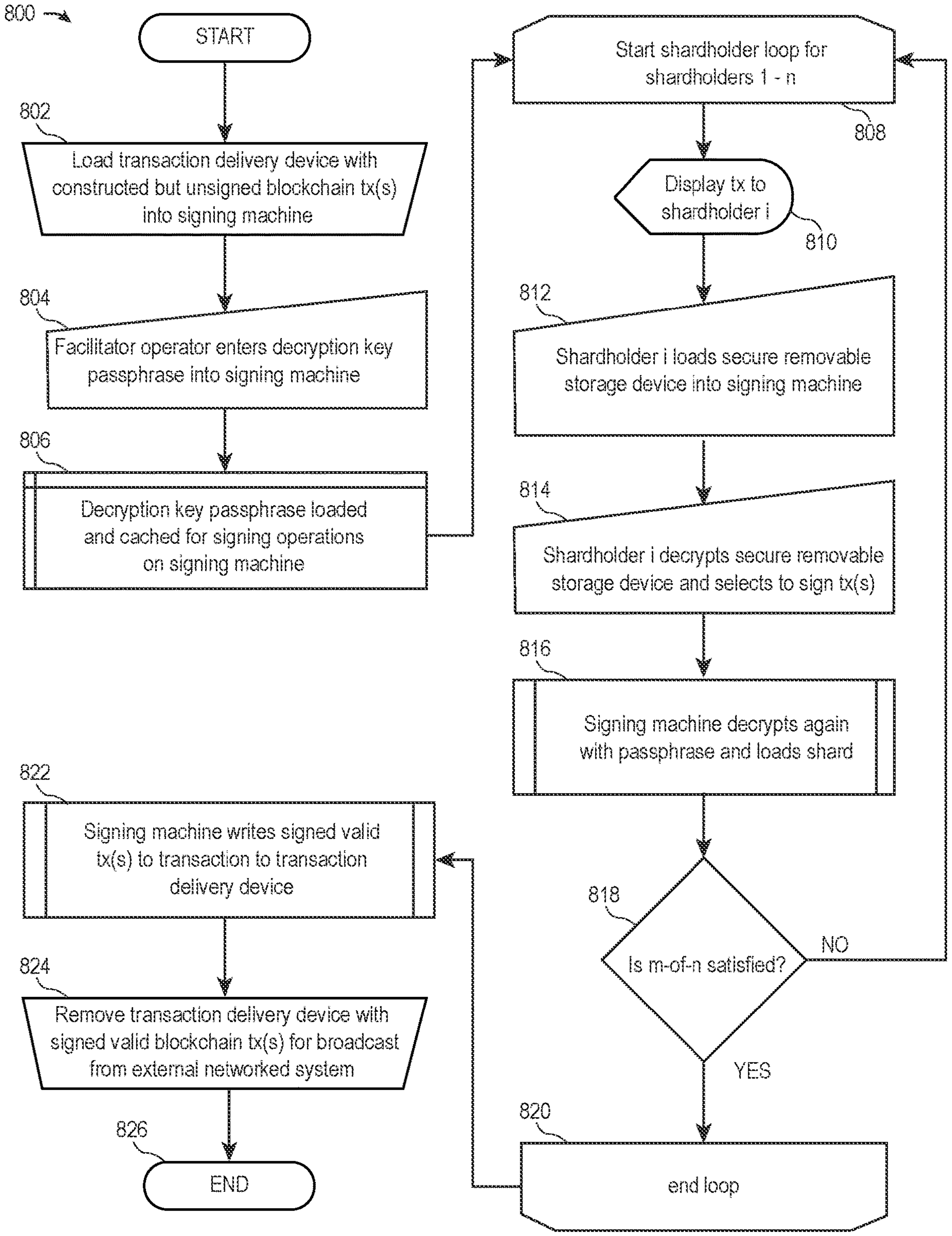
FIG. 8 is an example workflow to signing a blockchain transaction with a spending key derived from a quorum of shards in accordance with some blockchain implementations where multisignature is not natively supported.

FIG. 8 is an example workflow 800 for signing a blockchain transaction with a spending key derived from a quorum of shards in accordance with some implementations. At operation 802, a facilitator loads a transaction delivery device with a constructed but unsigned, and thus not valid under the blockchain consensus rules, transaction into the signing machine. At operation 804, the facilitator enters a decryption key or equivalent (e.g., passphrase, PIN, biometric) into the signing machine, which is loaded at operation 806 for purposes of performing the operations described herein.

At operation 808 starts a loop through the set of shard holders 1 through N. The loop 808 need not strictly loop though the entire group, or loop in any particular order, as long as M shard holders participate, then the signing process will be successful. In one implementation, the transaction is displayed to the shard holder at operation 810, such as through a terminal on the signing machine. Other information including shard holder names, which shard holders are available to sign, which shard holders have already signed, etc. may also be displayed at this step.

If the shard holder wishes to continue, she loads her secure removable storage device that was provisioned to her during the key generation ceremony into the signing machine at operation 812. At operation 814, the shard holder decrypts the secure removable storage device. This can be done by entering a PIN on the device, a passphrase, a biometric, etc. Secting to sign the transaction can include approving the signature via the terminal of the signing device or simply by the decryption operation itself. At operation 816, the signing machine decrypts the payload from the secure removable storage device again, using the decryption key from operation 804.

The loop 808 continues until the m-of-n requirement is satisfied at operation 818, upon which time the loop ends at operation 820. The quorum having been reached, the signing machine writes the valid, signed blockchain transaction to the transaction delivery device at operation 822. The facilitator can then remove the transaction delivery device with the signed valid blockchain transaction for delivery to the customer-facing custody platform to broadcast to the network of the blockchain at operation 824. When the signed valid transaction has been included in the blockchain (e.g., by being mined), the funds will have been moved out of the cold wallet and the workflow 800 ends at operation 826.

Figure 9:
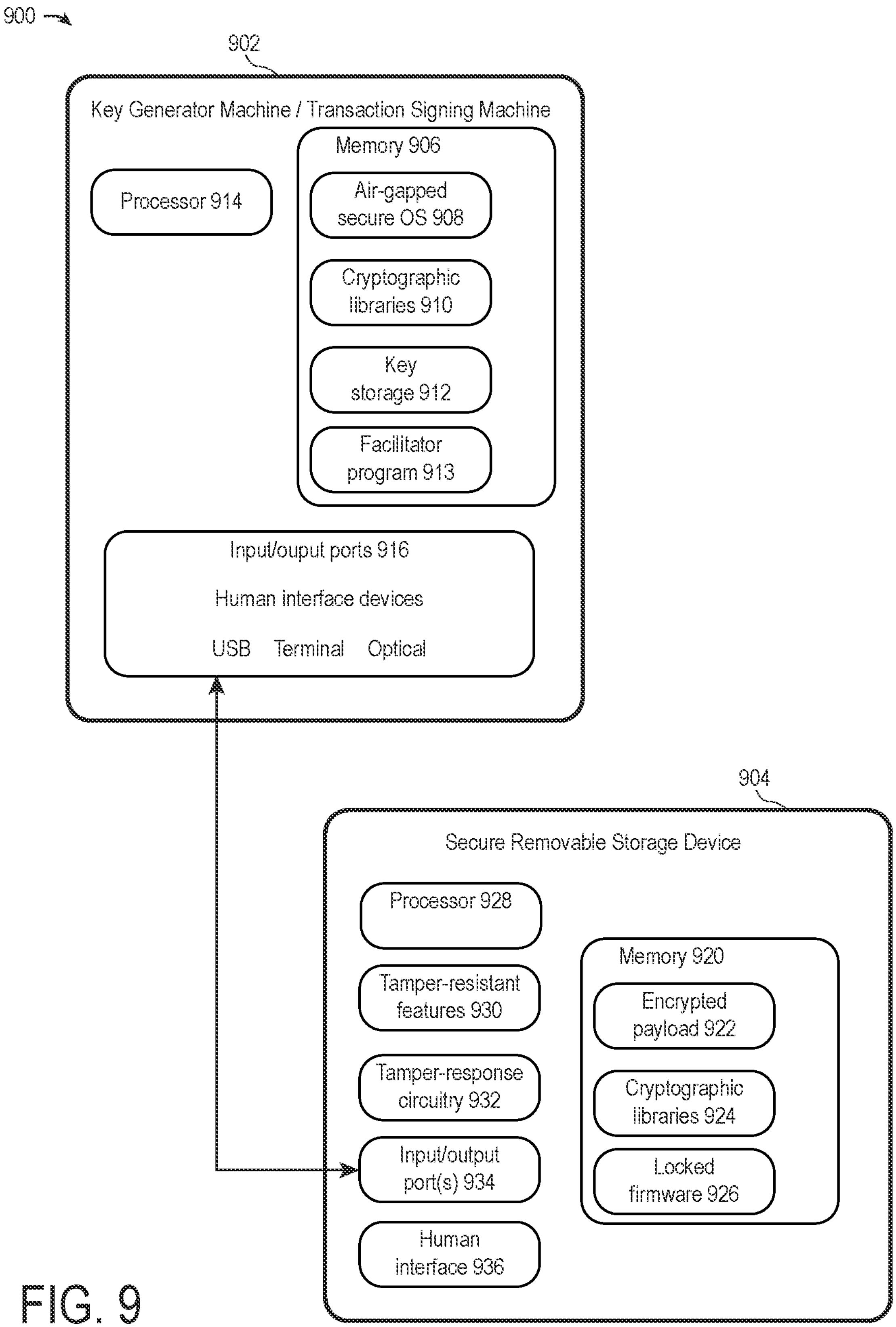
FIG. 9 is a block diagram of hardware components of an example a key generator and transaction signing machine configuration with the key part or shard storage device.

FIG. 9 is a block diagram 900 of hardware components of an example an key generator machine/transaction signing machine 902 and secure removable storage device 904 in accordance with some implementations. Turning first to the machine 902, there is a processor 914 operatively connected to the memory 906 that stores certain modules used to carry out the functions described herein. One module is an air-gapped secure OS 908. The air-gapped secure OS 908 may have features including the lack of computer network device drivers, checksums to compare an image of the OS 908 to a known OS image fingerprint, lack of wireless communications drivers, two-factor authentication login setup and support for a facilitator to use a TOTP (Time-based One Time use Password) to log into the machine 902, etc. The memory 906 further includes cryptographic libraries 910 for carrying out functions described herein including computing hash digests, signing blockchain transactions in accordance with consensus rules, decrypting payloads, etc. A key storage 912 can be a temporary storage for holding facilitator decryption keys, decrypted payloads from secure removable devices of key holders, digital fingerprints, etc.

A facilitator program 913 can run on the machine 902 executed by the processor 914 to guide the participants through the process of a key generation ceremony and/or creating a valid spending transaction with a quorum of key holders. The facilitator program 913 may perform functions including authenticating a facilitator authorized to bring blockchain transactions for quorum signing, running a copy of cryptocurrency node software capable of signing the blockchain transaction delivered by the facilitator, presenting a user interface to the facilitator for specifying configuration options, to the key signers prompting each signer to insert her secure removable storage device, and displaying informational messages regarding the progress of a key generation ceremony and/or a transaction signing process.

A set of input/output ports 916 can include human interface devices (e.g., mouse and keyboard), ethernet ports, USB ports, serial ports, and a terminal for displaying messages. The set 916 of input/output ports can be used to initialize the machine 902, upgrade modules in the memory 906, provision secure removable storage devices with secret payloads, receive payloads from secure removable storage devices, etc. As disclosed herein, the machine 902 may be air-gapped, in which case the ethernet port, or any other input/output port, would not be connected to the internet or any other computer network. The ethernet port could be used only for local communications with the secure removable storage device 904. In other implementations, as many input/output ports as possible are disabled to reduce potential attack surfaces.

The secure removable storage device 904 may be a handheld device that the key holder can easily carry and store. Devices that satisfy the FIPS 140-2 Level 2 or 3 requirements would likely be suitable for use as a secure removable storage device 904. The device 904 includes a memory 920 with several modules. The encrypted payload 922 is a storage area for persistent storage of the payload, which is be encrypted before loading onto the device 904 and encrypted again by the device 904 itself. Cryptographic libraries 924 can perform the encryption function as well as cryptographic hash functions for verifying the payload and the other components of the system (e.g., in the case of a firmware update). The locked firmware 926 may require a key to update that is not in the possession of the key holder or, in some cases, may not be updated at all without resetting the device 904. A processor 928 executes program code stored on the memory 920.

The secure removable storage device 904 may include tamper-resistant features 930. The tamper-resistant features include tamper-evident coatings or tamper-evident seals on the device that would have to be broken in order to insert the device 904 into a computer. In implementations, the tamper-evident seals can be placed across the input/output port 934 such that information cannot be read from the device using the port without breaking the seal and revealing that the port 934 had been used. The tamper-resistant features 930 can include seals internal to the device 904 such that, if an attacker attempts to gain physical access to the circuitry inside the device, it will be apparent that access has been attempted.

Another security feature of the device 904 is the tamper-resistant circuitry 932. The tamper-resistant circuitry 932 can be triggered based on input to the device that is deemed suspicious, such as exceeding a threshold of unlocking attempts, rate-limiting unlocking attempts (e.g., number or rate of incorrect PIN entries, failed biometric matches, etc.), removal of the covers or doors of circuitry associated with the cryptographic libraries 924 or other parts of the device 904. Once triggered, the tamper-resistant circuitry 932 can perform lock down functions that render the device 904 inoperable or even disable the device 904 completely to ensure the encrypted payload 922 is never leaked (e.g., zero out any plaintext critical security parameters, deleting the encrypted payload 922, etc.).

The input/output ports 934 can include a variety of communication protocol ports, depending on compatibility with the input/output ports 916 of the machine 902, such as USB, etc. The human interface components 936 can include a display screen for reading configuration options and navigating configuration menus (e.g., a small LCD or LED display), a keypad for entering PIN codes and/or passphrases, input buttons for navigating configuration menus and making configuration selections, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A secure hardware cryptocurrency keystore system for performing a key generation ceremony comprising:

an air-gapped cryptocurrency generator machine including:

a terminal for accepting configuration parameters for a cryptocurrency key generation ceremony with a group of individual key holders;

an entropy source;

a key generator machine processor that executes key generation instructions to create a master seed based on the entropy source, to generate a fingerprint comprising a hash of the master seed, and to generate a set of private keys based on the master seed, wherein the master seed is deleted after use;

a set of secure removable storage devices, each secure removable storage device in the set of secure removable storage devices being uniquely associated with one individual key holder in the group of individual key holders;

a key distribution input/output data port in communication with the key generator machine processor that receives the set of secure removable storage devices; and a facilitator encryption key for generating facilitator encrypted payloads, each facilitator encrypted payload including the fingerprint and at least one private key of the set of private keys uniquely associated with one individual key holder in the group of individual key holders, and each facilitator encrypted payload being generated using the facilitator encryption key before being copied to one secure removable storage device in the set of secure removable storage devices; and each secure removable storage device in the set of secure removable storage devices including a secure removable storage device processor configured to store and further encrypt a respective facilitator encrypted payload using a local encryption key independent of the facilitator encryption key, the local encryption key and the facilitator encryption key forming a double encryption architecture such that none of the individual key holders or a facilitator has access to the master seed or the set of private keys.

2. The secure hardware cryptocurrency keystore system of claim 1, wherein the key generator machine processor encrypts, using a master payload encryption key, each facilitator encrypted payload before being copied to one of the secure removeable storage devices.

3. The secure hardware cryptocurrency keystore system of claim 1, wherein at least one of the facilitator encrypted payloads includes an extended private key.

4. The secure hardware cryptocurrency keystore system of claim 1, further comprising: a removeable blockchain transaction delivery device to which the key generator machine processor copies an extended public key based on the master seed via the key distribution input/output data port.

5. The secure hardware cryptocurrency keystore system of claim 1, wherein each secure removable storage device in the set of secure removable storage devices include anti-tamper circuitry.

6. The secure hardware cryptocurrency keystore system of claim 1, wherein the set of private keys are shards produced according to Shamir's Secret Sharing Scheme (S4).

7. The secure hardware cryptocurrency keystore system of claim 6, wherein the key generation instructions include a request via the terminal for the facilitator to select an m-of-n sharding arrangement for generation of the shards.

8. The secure hardware cryptocurrency keystore system of claim 1, wherein the master seed is one of a plurality of master seeds.

9. The secure hardware cryptocurrency keystore system of claim 1, further comprising:

a decryption key storage removable drive that stores the facilitator encryption key used in generating each facilitator encrypted payload; and a second input/output port that receives the decryption key storage removable drive.

10. The secure hardware cryptocurrency keystore system of claim 1, further comprising: a second removable storage device, wherein the second secure removable storage device stores a public key corresponding to a private key of the set of private keys uniquely associated with an individual key holder of the group of individual key holders.

11. The secure hardware cryptocurrency keystore system of claim 1, further comprising: a transaction signing machine that receives a second removable storage device comprising an unsigned blockchain transaction constructed from a public key corresponding to a private key of the set of private keys uniquely associated with an individual key holder of the group of individual key holders.

12. A secure hardware cryptocurrency keystore system for signing a blockchain transaction comprising:

a set of secure removable storage devices, each secure removable storage device being uniquely associated with one member of a group of key holders, each secure removable storage device containing a payload comprising a fingerprint and at least one signing key of a set of signing keys generated using a master seed, the fingerprint including a hash of the master seed, each payload encrypted using a facilitator encryption key before being copied to a respective secure removable storage device and further encrypted using a local encryption key after being copied to the respective secure removable storage device, the local encryption key independent of the facilitator encryption key such that the local encryption key and the facilitator encryption key form a double encryption architecture;

a blockchain transaction delivery removable storage device uniquely associated with a facilitator, the blockchain transaction delivery removable storage device containing an unsigned raw blockchain transaction;

an air-gapped cryptocurrency key generator machine including:

a terminal;

a data input/output port that receives the blockchain transaction delivery removable storage device and the set of secure removable storage devices;

a keysign processor in communication with the data input/output port, the keysign processor executing key signing instructions including:

prompting the facilitator via the terminal to insert the blockchain transaction delivery removable storage device into the data input/output port;

copying the unsigned raw blockchain transaction from the blockchain transaction delivery removable storage device;

prompting members of the group of key holders to insert their respective secure removable storage devices into the data input/output port and to unlock their respective payloads contained in their respective secure removable storage devices;

reading each signing key from each unlocked payload;

notifying the facilitator when a quorum number of signing keys has been read, the quorum number being based on the raw unsigned blockchain transaction;

signing the raw unsigned blockchain transaction with the signing keys to yield a signed valid blockchain transaction; and copying the signed valid blockchain transaction to the blockchain transaction delivery device.

13. The secure hardware cryptocurrency keystore system of claim 12, wherein the blockchain transaction delivery removable storage device includes a master decryption key corresponding to the facilitator encryption key.

14. The secure hardware cryptocurrency keystore system of claim 13, wherein the keysign processor decrypts each signing key from each unlocked payload with the master decryption key.

15. The secure hardware cryptocurrency keystore system of claim 12, wherein signing keys in the set of signing keys are shards of the master seed.

16. The secure hardware cryptocurrency keystore system of claim 15, wherein the keysign processor reconstructs the master seed based on a quorum of shards.

17. The secure hardware cryptocurrency keystore system of claim 16, wherein the keysign processor verifies the master seed against copy of the fingerprint read from the blockchain transaction delivery device.

* * * * *